United States Patent [19]

Edwards et al.

[11] Patent Number: 4,956,550

[45] Date of Patent: Sep. 11, 1990

[54] SUB-SEA FIBER OPTIC CABLE LOCATION APPARATUS WITH A PLURALITY OF TRANSPONDER MEANS

[75] Inventors: Geoffrey S. Edwards, Grange-over-Sands; Robert S. Tebble, Wilmslow, both of England

[73] Assignee: Oxley Developments Company Limited, London, England

[21] Appl. No.: 296,785

[22] Filed: Jan. 13, 1989

[30] Foreign Application Priority Data

Jan. 16, 1988 [GB] United Kingdom ............... 8800972

[51] Int. Cl.⁵ .................... H01J 5/16; G02B 6/02; G01N 21/00
[52] U.S. Cl. .................. 250/227.15; 356/73.1; 455/601; 350/96.29
[58] Field of Search ............ 250/227, 227.15; 356/73.1; 455/600, 601, 7617, 606, 607; 350/96.29, 96.15

[56] References Cited

U.S. PATENT DOCUMENTS

| | | | |
|---|---|---|---|
| 3,906,223 | 9/1975 | White | 250/227 |
| 3,936,631 | 2/1976 | Muska | 250/227 |
| 4,217,598 | 8/1980 | d'Auria et al. | 250/227 |
| 4,252,402 | 2/1981 | Puech et al. | 250/227 |
| 4,339,658 | 7/1982 | Fromm et al. | 356/73.1 |
| 4,708,476 | 11/1987 | So et al. | 356/73.1 |
| 4,820,916 | 4/1989 | Patriquin | 250/227 |
| 4,840,482 | 6/1989 | Shigematsu et al. | 250/227 |

*Primary Examiner*—David C. Nelms
*Assistant Examiner*—Michael Messinger
*Attorney, Agent, or Firm*—Staas & Halsey

[57] ABSTRACT

A sub-sea fiber-optic cable location indication apparatus wherein a small portion of a light signal carried by a main optical fiber cable is tapped off and is used to trigger or control a parameter of an electromagnetic, or acoustic signal radiated by a transponder carried by the main cable.

6 Claims, 1 Drawing Sheet

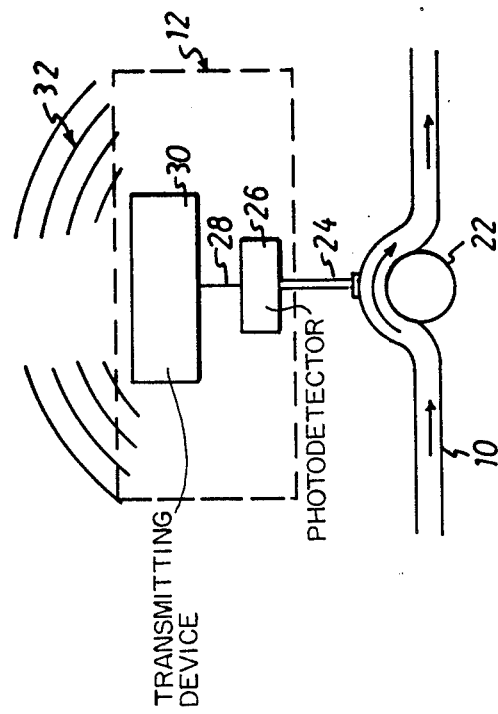
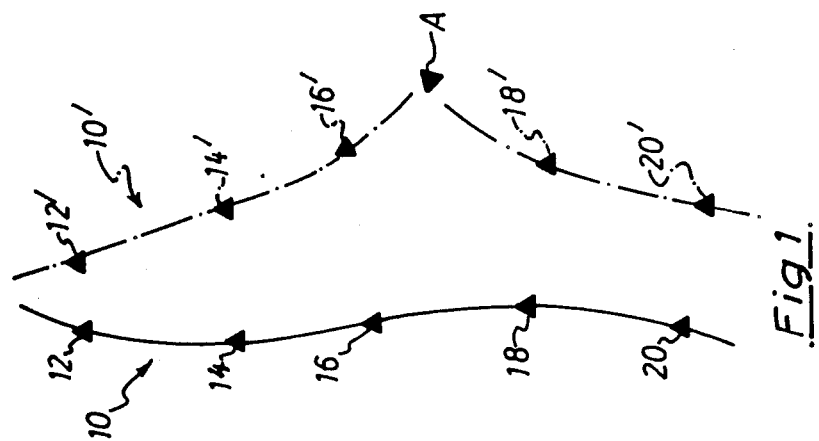

SUB-SEA FIBER OPTIC CABLE LOCATION APPARATUS WITH A PLURALITY OF TRANSPONDER MEANS

BACKGROUND OF THE INVENTION

1. Field of the Invention

The present invention relates to sub-sea fibre-optic cable location apparatus.

2. Description of the Related Art

Communication systems commonly utilize sub-sea cables to carry communication signals. Due to the expanse of water separating some countries these cables often have to be extremely long and where conventional materials are used, e.g. copper, this may prove relatively expensive.

Since sub-sea cables are obscured from view and are often buried in the sea bed, the location of physical faults, for example breakage, is severely inhibited. The difficulty in locating a fault increases with the length of the sub-sea cable.

With conventional communication cables the location of breakage and the subsequent position of the broken cables may be found by using position location devices which utilise an electrical signal passed along the actual cable which either reflect or transmit signals which can be received by a cable locating apparatus. In addition, position location devices can utilise the communication cable for their source of power to transmit a position location signal.

However, the advent of fiber-optic communication cables to increase signal quality, and reduce cost with much increased carrying capacity, presents further difficulties. Even though the length of a cable before the fault may be found by injecting light into one end of the fiber and measuring the signal reflected by the fault, difficulties still occur when trying to locate the exact position of the damaged cable, particularly since the combination of ocean currents and the initial force that caused the damage may have displaced the cable a considerable distance from its original position. These difficulties arise from the fact that fiber optics do not radiate signals and the provision of conductors in the fiber-optic cable in order to power position indication transmitting devices is more difficult. Fiber-optic cables are also less detectable by conventional metal detectors because they contain less metal.

In addition, in order to protect the cable they are increasingly buried even in deep ocean beds and in these cases fiber cable location is even more difficult with conventional means.

With the increasing use of sub-sea fiber-optic cables in communication systems it would therefore be advantageous if an apparatus could be provided which locates the exact position of a fault or breakage of the cable and it is an object of the present invention to satisfy this need.

SUMMARY OF THE INVENTION

In accordance with the present invention, a small portion of the light signal carried by the main optical fiber cable is tapped off and is used to trigger or control a parameter of an electromagnetic, or acoustic signal radiated by a transponder carried by the main cable.

Preferably, said small portion of the light signal in the main cable is tapped off by arranging for the main cable to be bent around an arcuate path such that a portion of the light signal emerges from the cable at the bend but the majority of the signal negotiates the bend and passes on along the cable.

The tapped off portion of the light signal is preferably converted into an electrical signal which is then used to control the signal radiated by a transmitting part of the transponder. Advantageously, the transmitter is only activated upon receipt of a predetermined coded instruction in said tapped portion of the light signal so that, of a plurality of similar transponders disposed at intervals along the length of a fiber-optic cable, only that, or those, transponder or transponders in the region of a cable search need be activated.

BRIEF DESCRIPTION OF THE DRAWINGS

The invention is described further hereinafter, by way of example only, with reference to the accompanying drawings, in which:

FIG. 1 in a schematic view of the possible position of one embodiment of a sub-sea fiber-optic cable of the present invention before and after breakage has occurred; and FIG. 2 is a schematic view of the apparatus of one embodiment of the present invention.

DESCRIPTION OF THE PREFERRED EMBODIMENTS

In FIG. 1 a sub-sea fibre-optic cable 10 having a plurality of transponder devices 12, 14, 16, 18 and 20 is illustrated. Each of the devices 12, 14, 16, 18 and 20, once energized, is capable of emitting a unique signal. The signal emitted by each device is related to its position along the cable. For example, if devices 12, 14, 16, 18 and 20 are the only devices located along the cable 10 then device 12 may emit a coded "1" signal, device 14 may emit a coded "2" signal, and so on, along the cable.

The sub-sea fiber-optic cable 10' illustrated as a chain dotted line is a possible position of the cable 10 after a force has acted so as to break the cable at A. Such a force may typically be exerted by a submarine vehicle or a submarine attachment to a surface vessel.

The actual length of the broken sections may be found by injecting light at the ends of the cable and measuring the light reflected at the breakage point A. However, it will still be necessary to locate the actual position of the cable sections which may have been influenced by other factors, for example ocean currents.

It has recently become known in the art that it is possible to tap off a small portion of the light signal in an optical-fiber cable by bending the optical fiber around a cylinder of specific radius. By special selection of the curvature of the cable it is possible to tap off a very small but sufficient quantity of light to provide a usable control signal whilst not degrading significantly the basic optical signal in the cable.

Referring now to FIG. 2, there is shown schematically a part of the optical cable 10 fitted with one of the series of similar transponders 12 to 20, in this case the transponder 12. Using the technique mentioned above, the cable 10 is arranged to be bent around a cylinder 22 disposed in the immediate vicinity of the transponder 12 so that a very small portion proportion of the light signal in the cable (e.g. of the order of 0.2%) is tapped off into a subsidiary fiber-optic light cable 24, the major part of the light signal in the cable 10 negotiating the curve and travelling on along the cable 10, passing the other transponders 14, 16, 18, 20 etc. on its way. The input end portion of the subsidiary fiber-optic cable lies substantially normal to the bend of the main cable, with its input end facet in close or abutting relationship therewith.

The small light signal entering the cable 24 is converted in a sensitive photodetector 26 into an electrical control signal which is passed via an electrical lead 28 to a transmitting device 30 in the transponder 12. The transmitting device 30 produces an electromagnetic or, more preferably, a sonar output signal 32 which is radiated upwardly towards the surface of the sea. A sonar signal is preferred, particularly in those cases where the cable 10 is actually buried in the ground beneath the sea since it is better able to penetrate the solid material of the sea-bed.

The tapped light signal in the cable 24 is used to control in a suitable manner the output signal 32 radiated by the transmitter 30. For example, the tapped signal can simply be used to trigger the transmitter into operation so that in the presence of the tapped signal the transmitter radiates and in the absence of the tapped signal it does not radiate. In another example, the presence or absence of the tapped signal could be used to control the amplitude of the signal radiated by the transmitter. However, as mentioned further below, it is preferred for the transmitter to radiate only when it receives a special code in the tapped signal unique to that particular transponder. In all cases, the signals radiated by the cable transmitter 30 can be used to identify the position of the cable and hence enable the location of a fault therein.

An advantageous feature of this system is that, since the general whereabouts of the cable is usually known, the radiated signal strength need not be great. The signals radiated by the transmitters 30 in the transponders can be picked up by trawled underwater devices, by manned submarine devices or, if the radiated signals are strong enough, by a surface vessel Electrical power for the transponders can either be supplied by internal long-life batteries or by way of small electrical cables incorporated into the fiber-optic cable itself.

Naturally, it would be disadvantageous to have all the transponders radiating permanently. Thus, individual transponders are preferably arranged to respond to coded input signals injected via the tapped light signal so that only those transponders radiate their signal which are in the immediate current vicinity of the cable search. Thus, for the purposes of a cable location exercise, a special signal would be injected into the cable 10 containing the code or codes for that or those particular transponders which is or are to be activated, i.e. those in the prevailing search area.

The transponders 12,14 etc. are designed so as to be compact, robust and mounted unobtrusively on the cable 10. To this end they are preferably formed as a substantially integral part of the cable 10.

We claim:

1. In a sub-sea optical fiber system having a main optical fiber cable, an apparatus used in searching for location of the cable, comprising:
   (a) means, disposed at a plurality of predetermined locations on said main optical fiber cable, each for tapping off a small portion of a light signal carried by said main optical fiber cable; and
   (b) a plurality of transponder means, each for radiating a signal, each being disposed on said main optical fiber cable at respective ones of said predetermined locations and each including
      (i) means for converting the tapped off small portion of the light signal into an electrical signal for activating said transponder measn, and
      (ii) means, responsive to said electrical signal, for controlling the radiation of the signal from said transponder means, said control measn being activated only upon receipt of a predetermioned coded instruction in said tapped portion of the light signal whereby, of the plurality of transponder means disposed on said main optical fiber cable, only selected ones of the plurality of transponder measn in a region of the cable being searched need be activated.

2. In a sub-sea optical fiber system having at least one main optical fiber cable, an apparatus used in searching for location of the cable, comprising:
   (a) means, disposed at a plurality of predetermined locations on said main optical fiber cable, each for tapping off a small portion of a light signal carried by said main optical fiber cable; and
   (b) a plurality of transponder means, each for radiating a signal, each being disposed on said main optical fiber cable at respective ones of said predetermined locations and eaqch including
      (i) means for converting the tapped off small portion of the light signal into an electrical sign for activating said transponder means, and
      (ii) measn, responsive to said electrical signal, for controlling the radiation of the signals from said transponder means, said control means being activated only upon receipt of a predetermined coded instruction in said tapped portion of the light signal whereby, of the plurality of transponder means disposed on said main optical fiber cable, only one transponder means ina region of the cable being searched need be activated.

3. In a sub-sea optical fiber system having at least one main optical fiber cable, an apparatus used in searching for location of the cable, comprising:
   (a) means, disposed at a plurality of predetermined locations on said main optical fiber cable, each for tapping off a small portion of a light signal carried by said main optical fiber cable; and
   (b) a plurality of transponder means, for each radiating a signal, each being disposed on said maion optical fiber cable at respective ones of said predetermined locations and each including
      (i) means for converting the tapped off small portion of the light signal into an electrical signal for activating said transponder means, and
      (ii) measn, responsive to said electrical signal, for controlling the radiation ofthe signal from said transponder means, said control measn being activated only upon receipt of predetermined coded instructions in said tapped portion of the light signal whereby, of the plurality of transponder means disposed on said main optical fiber cable, only selected groups of the transponder means in a region of cable being searched need be activated.

4. In a sub-sea optical fiber system having at least one main optical fiber cable, an apparatus used in searching for location of the cable, comprising:
   (a) means, disposed at a plurality of predetermined locations on said main optical fiber cable, each for tapping off small portion ofg a light signal carried by said main optical fiber cable; and (b) a plurality of transponder means, each for radiating a sonar signal, each being disposed on siad main optical fiber at respective ones of said predetermined locations and each including:
  (i) means for converting the tapped off portion of the light signal into an electrical signal for activating said transponder means, and
  (ii) means ,responsive to said electrical signal, for controlling the radiation of the signal from the plurality of transponder means, activated only upon receipt of a predetermined coded instruction in said tapped portion of the light signal whereby, of the plurality of transponder means disposed on said main optical fiber cable, only selected ones of the plurality of transponder means in a region of the cable bieng searched need be activated.

5. In a sub-sea optical fiber system having at least one main optical fiber cable, an apparatus used in searching for location of the cable, comprising:

(a) means, disposed at a plurality of predetermined locations on said main optical fiber cable, each for tapping off small portions of a light signal carried by said main optical fiober cable; and (b) a plurality of transponder means, each for radiating electromagnetic signals, each being disposed on said main optical fiber cablwe at respective ones of said predetermined locations and each including
  (i) measn for converting the tapped off portion of the light signal into an electrical signal for activating said transponder means, and
  (ii) means, responsive to said electrical signal, for controlling the radiation of the signal from said transponder means, said control means being activated only upon receipt of a predetermuined coded instruction in said tapped portion of the light signal whereby, of the plurality of trnasonder means disposed on said main optical fiber cable only selected ones of the plurality of transponder means in a region of the dable need be activated.

6. In a sub-sea optical fiber system having at least one main optical fiber cable, an aparatus used in searching for location of the cable, comprising:

(a) a plurlaity of means, disposed at a plurality of predetermined locations on said main optical fiber cable, each for tapping off a small portion of a light sdignal carried by said main optical fiber cable, each of the plurality of tapping off means including a member about which said main optical fiber cable is bent at each of said predetermined locatrions in an arcuate path such that a portion of the light signal carried by said main optical fiber cable emerges from the cable at the bend but the majority of the signal negotiates the bend and passes on along said main optical fiber cable, and a subsidiary optical fiber disposed substantially normal to the bend and into which the tapped off portion ofthe light signal leaks;

(b) a plurality of transponder means, each for radiating signals, each being disposed on said main optical fiber cable at respective ones of said predetermined locations each including:
  (i) measn for converting the tapped off portion of the light signal into an electricla signal for activating the transponder means, and (c) means, responsive to said electrical signa, for controlling the radiation of the signal from said transponder means, said control means being acrtivated only upon receipt of a predetermined coded instruction in said tapped portion of the light signal whereby, of the plurality of transponder means disposed on said main optical fiber cable, only selected ones of the pluralitty of transponder means in a region of the cable being searched need be activated.

* * * * *